US011766701B2

(12) United States Patent
Sun

(10) Patent No.: US 11,766,701 B2
(45) Date of Patent: Sep. 26, 2023

(54) ELECTRIC STEAM CONTROL METHOD, ELECTRIC STEAM CONTROL SYSTEM, AND STEAM CLEANER

(71) Applicant: Nanjing Dayoo Electronics Technology Co., Ltd., Jiangsu (CN)

(72) Inventor: Jun Sun, Jiangsu (CN)

(73) Assignee: Nanjing Dayoo Electronics Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/873,150

(22) Filed: Jul. 26, 2022

(65) Prior Publication Data
US 2023/0036413 A1   Feb. 2, 2023

(30) Foreign Application Priority Data

Jul. 27, 2021   (CN) .......................... 202110847508.5

(51) Int. Cl.
*B08B 3/00*   (2006.01)
*A47L 11/40*   (2006.01)
(Continued)

(52) U.S. Cl.
CPC ............. *B08B 3/00* (2013.01); *A47L 11/4011* (2013.01); *F22B 35/08* (2013.01); *A47L 11/34* (2013.01);
(Continued)

(58) Field of Classification Search
CPC .. A47L 11/4011; A47L 11/34; A47L 11/4005; A47L 11/4008; A47L 11/4019;
(Continued)

(56) References Cited

U.S. PATENT DOCUMENTS

| 5,117,092 A * | 5/1992 | Shimizu .................. D06F 75/26 |
| | | 38/82 |
| 6,622,404 B2 * | 9/2003 | Valiyambath ........... D06F 79/02 |
| | | 38/77.8 |

(Continued)

FOREIGN PATENT DOCUMENTS

| CN | 104028487 | 9/2014 |
| CN | 110968127 | 4/2020 |

(Continued)

OTHER PUBLICATIONS

KR 20160116169 A—Translation (Year: 2016).*
JP-2015009197-A—Translation (Year: 2015).*

*Primary Examiner* — Steven B McAllister
*Assistant Examiner* — Benjamin W Johnson
(74) *Attorney, Agent, or Firm* — JCIPRNET

(57) ABSTRACT

The present disclosure provides an electric steam control method, a system thereof, and a steam cleaner. The method includes: obtaining current water temperature data of a hot water tank and a current power supply mode; determining whether a temperature corresponding to the current water temperature data is within a preset temperature range; and if the temperature is within the preset temperature range, entering a heat preservation mode, else detecting whether AC power is currently available; if the AC power is available, performing power supply using the AC power, else generating a water temperature alarm signal; and in the heat preservation mode, detecting whether a working state is currently in place; if the working state is in place, detecting whether the AC power is currently available and generating a steam ejection signal, and performing power supply by using the AC or DC power, else maintaining the heat preservation mode.

3 Claims, 2 Drawing Sheets

(51) Int. Cl.
*F22B 35/08* (2006.01)
*A47L 11/34* (2006.01)
*G01D 21/02* (2006.01)
*H02J 7/00* (2006.01)
*H02J 7/02* (2016.01)
*H02J 9/06* (2006.01)

(52) U.S. Cl.
CPC ........ *A47L 11/4005* (2013.01); *A47L 11/4008* (2013.01); *A47L 11/4019* (2013.01); *B08B 2203/007* (2013.01); *B08B 2230/01* (2013.01); *G01D 21/02* (2013.01); *H02J 7/0048* (2020.01); *H02J 7/0068* (2013.01); *H02J 7/02* (2013.01); *H02J 9/06* (2013.01); *H02J 9/068* (2020.01)

(58) Field of Classification Search
CPC . B08B 3/00; B08B 2203/007; B08B 2203/01; B08B 3/02; B08B 3/026; B08B 3/028; F22B 35/08; F22B 35/18; G01D 21/02; H02J 7/0048; H02J 7/0068; H02J 7/02; H02J 9/06; H02J 9/068
USPC ...................................................... 122/448.1
See application file for complete search history.

(56) References Cited

U.S. PATENT DOCUMENTS 10,214,852 B2 * 2/2019 Charlton ................. D06F 73/00
2007/0130718 A1 * 6/2007 Chung ................ A47L 11/4086
15/320

FOREIGN PATENT DOCUMENTS

JP 2015009197 A * 1/2015
KR 20160116169 A * 10/2016

* cited by examiner

ELECTRIC STEAM CONTROL METHOD, ELECTRIC STEAM CONTROL SYSTEM, AND STEAM CLEANER

CROSS-REFERENCE TO RELATED APPLICATIONS

This application claims the priority benefit of China application serial no. 202110847508.5, filed on Jul. 27, 2021. The entirety of the above-mentioned patent application is hereby incorporated by reference herein and made a part of this specification.

TECHNICAL FIELD

The present disclosure belongs to the technical field of steam cleaners, and specifically, relates to an electric steam control method, an electric steam control system, and a steam cleaner.

BACKGROUND

With the improvement of people's living standards and the progress of science and technology, more household appliances with different functions appear and are widely recognized by consumers. Household cleaning equipment is one of the most popular electrical appliances at present.

Traditional cleaning equipment usually uses water and detergent as cleaning media. However, detergent with a good decontamination effect makes almost no difference in the face of the following situation.

Cooking a dish often produces much lampblack. Although some of the lampblack may be sucked away by a kitchen ventilator, the rest is often attached to the floor and wall surface of a kitchen, a surface of a cooking bench, or other places. Over time, more oil stains are accumulated and gradually become sticky and solidified, and eventually cannot be effectively removed by using traditional cleaning equipment.

In view of the above, steam cleaning equipment emerged, which uses high-temperature steam to remove this kind of oil stains and other contaminants on the surface, thereby greatly improving the cleaning effect. This, however, leads to new problems. The steam cleaning equipment is a high-power electrical appliance because it is equipped with a heating apparatus. In order to quickly generate steam, the mains supply is directly adopted to power this kind of equipment. Therefore, this kind of cleaning equipment needs to be equipped with an electric cord before being used. If this kind of equipment is powered by using a battery, the battery life of the equipment is greatly shortened, which inevitably declines cleaning efficiency. As can be seen, there are many limitations and inconveniences in the use of the traditional steam equipment.

SUMMARY

A technical problem to be resolved by the present disclosure is to provide an electric steam control method, an electric steam control system, and a steam cleaner, which adopt a new power supply mode to enable a cleaning apparatus to have a longer battery life under battery power supply.

The present disclosure is implemented by the following technical solutions.

The present disclosure provides an electric steam control method, including: obtaining current water temperature data of a hot water tank and a current power supply mode; determining whether a temperature corresponding to the current water temperature data of the hot water tank is within a preset temperature range; and if the temperature is within the preset temperature range, entering a heat preservation mode; or if the temperature is not within the preset temperature range, detecting whether an alternating current (AC) power is currently available, and performing a power supply by using the AC power if the AC power is available, or generating a water temperature alarm signal if the AC power is unavailable; and giving a first alarm in response to the water temperature alarm signal; heating, by a heat treatment unit, a medium in the hot water tank in response to a heating signal; in the heat preservation mode, detecting whether a working state is currently in place; and if the working state is in place, detecting whether the AC power is currently available and generating a steam ejection signal, and performing the power supply by using the AC power if the AC power is available, or performing the power supply by using a direct current (DC) power if the AC power is unavailable; or if the working state is not in place, maintaining the heat preservation mode; and ejecting steam in response to the steam ejection signal.

Further, before determining whether the temperature corresponding to the current water temperature data of the hot water tank is within the preset temperature range, the electric steam control method further includes: obtaining current water volume data of the hot water tank; determining whether a first water volume corresponding to the current water volume data of the hot water tank reaches a preset hot water volume, and performing water temperature detection if the first water volume reaches the preset hot water volume, or generating a water pumping signal and a hot water volume alarm signal if the first water volume does not reach the preset hot water volume; supplying water to the hot water tank from a cold water tank in response to the water pumping signal; and giving a second alarm in response to the hot water volume alarm signal.

Further, before determining whether the first water volume corresponding to the current water volume data of the hot water tank reaches the preset hot water volume, the electric steam control method further includes: obtaining current water volume data of the cold water tank; determining whether a second water volume corresponding to the current water volume data of the cold water tank reaches a preset cold water volume, and performing hot water volume detection if the second water volume reaches the preset cold water volume, or generating a cold water volume alarm signal and a stop signal if the second water volume does not reach the preset cold water volume; giving a third alarm in response to the cold water volume alarm signal; and suspending work in response to the stop signal.

Further, before determining whether the second water volume corresponding to the current water volume data of the cold water tank reaches the preset cold water volume, the electric steam control method further includes: obtaining current electricity quantity data of a DC power supply unit; detecting whether the AC power is currently available; and if the AC power is available, performing power supply and charging by using the AC power; or if the AC power is unavailable, determining whether an electricity quantity corresponding to the current electricity quantity data of the DC power supply unit reaches a preset electricity quantity, and maintaining a current status if the electricity quantity reaches the preset electricity quantity, or generating an electricity quantity alarm signal if the electricity quantity does not reach the preset electricity quantity; and giving a fourth alarm in response to the electricity quantity alarm signal.

The present disclosure further provides an electric steam control system, including: a temperature sensing unit configured to obtain current water temperature data of a hot water tank; a power supply sensing unit configured to obtain a current power supply mode; a central control unit configured to determine whether a temperature corresponding to the current water temperature data of the hot water tank is within a preset temperature range; and if the temperature is within the preset temperature range, enter a heat preservation mode; or if the temperature is not within the preset temperature range, detect whether AC power is currently available, and perform power supply by using the AC power if the AC power is available, or generate a water temperature alarm signal if the AC power is unavailable; and in the heat preservation mode, detect whether a working state is currently in place; and if the working state is in place, detect whether the AC power is currently available and generate a steam ejection signal, and perform power supply by using the AC power if the AC power is available, or perform power supply by using DC power if the AC power is unavailable; or if the working state is not in place, maintain the heat preservation mode; a relay switching unit configured to perform power supply by using the AC power if the AC power is available, and perform power supply by using the DC power if the AC power is unavailable; a heat treatment unit configured to heat a medium in the hot water tank in response to a heating signal; a state detection unit configured to detect whether a working state is currently in place; a DC power supply unit configured to power the heat treatment unit in a DC power supply mode; an AC power supply unit configured to power the heat treatment unit in an AC power supply mode; a steam generation unit configured to eject steam in response to a steam ejection signal; and an alarm unit configured to give a first alarm in response to the water temperature alarm signal.

Further, the electric steam control system further includes: a hot water volume sensing unit configured to obtain current water volume data of the hot water tank; and a water supply unit configured to supply water to the hot water tank from a cold water tank in response to a water pumping signal, where the alarm unit is further configured to give a second alarm in response to a hot water volume alarm signal; and the central control unit is further configured to determine whether a first water volume corresponding to the current water volume data of the hot water tank reaches a preset hot water volume, and perform water temperature detection if the first water volume reaches the preset hot water volume, or generate the water pumping signal and the hot water volume alarm signal if the first water volume does not reach the preset hot water volume.

Further, the electric steam control system further includes: a cold water volume sensing unit configured to obtain current water volume data of the cold water tank, where the alarm unit is further configured to give a third alarm in response to a cold water volume alarm signal; the central control unit is further configured to determine whether a second water volume corresponding to the current water volume data of the cold water tank reaches a preset cold water volume, and perform hot water volume detection if the second water volume reaches the preset cold water volume, or generate the cold water volume alarm signal and a stop signal if the second water volume does not reach the preset cold water volume; and the heat treatment unit is further configured to suspend work in response to the stop signal.

Further, the electric steam control system further includes: an electricity quantity detection unit configured to obtain current electricity quantity data of the DC power supply unit, where the alarm unit is further configured to give a fourth alarm in response to an electricity quantity alarm signal; and a charging management unit configured to charge the DC power supply unit if the AC power is available, where the central control unit is further configured to detect whether the AC power is currently available; and if the AC power is available, perform power supply and charging by using the AC power; or if the AC power is unavailable, determine whether an electricity quantity corresponding to the current electricity quantity data of the DC power supply unit reaches a preset electricity quantity, and maintain a current status if the electricity quantity reaches the preset electricity quantity, or generate the electricity quantity alarm signal if the electricity quantity does not reach the preset electricity quantity.

The present disclosure further provides a steam cleaner, including a processor and a memory, where the memory stores a computer program, and the computer program is executed by the processor to implement the steps of the electric steam control method described above.

The present disclosure has the following beneficial effects. The steam control method in the present disclosure has a relay power supply mode to prolong a battery life in a cordless handheld state. That is, a cleaning medium is first heated to a higher temperature by using a mains power supply, and then a battery is used to heat the cleaning medium with the higher temperature to a temperature at which steam can be generated, so as to reduce the load of the battery. This can meet a use requirement in the cordless handheld state, and improve the cleaning range and user experience.

DETAILED DESCRIPTION OF THE EMBODIMENTS

The prevent disclosure is further described below with reference to the accompanying drawings. The following embodiments are only used for describing the technical solutions of the present disclosure more clearly, and are not intended to limit the protection scope of the present disclosure.

Figure 1:
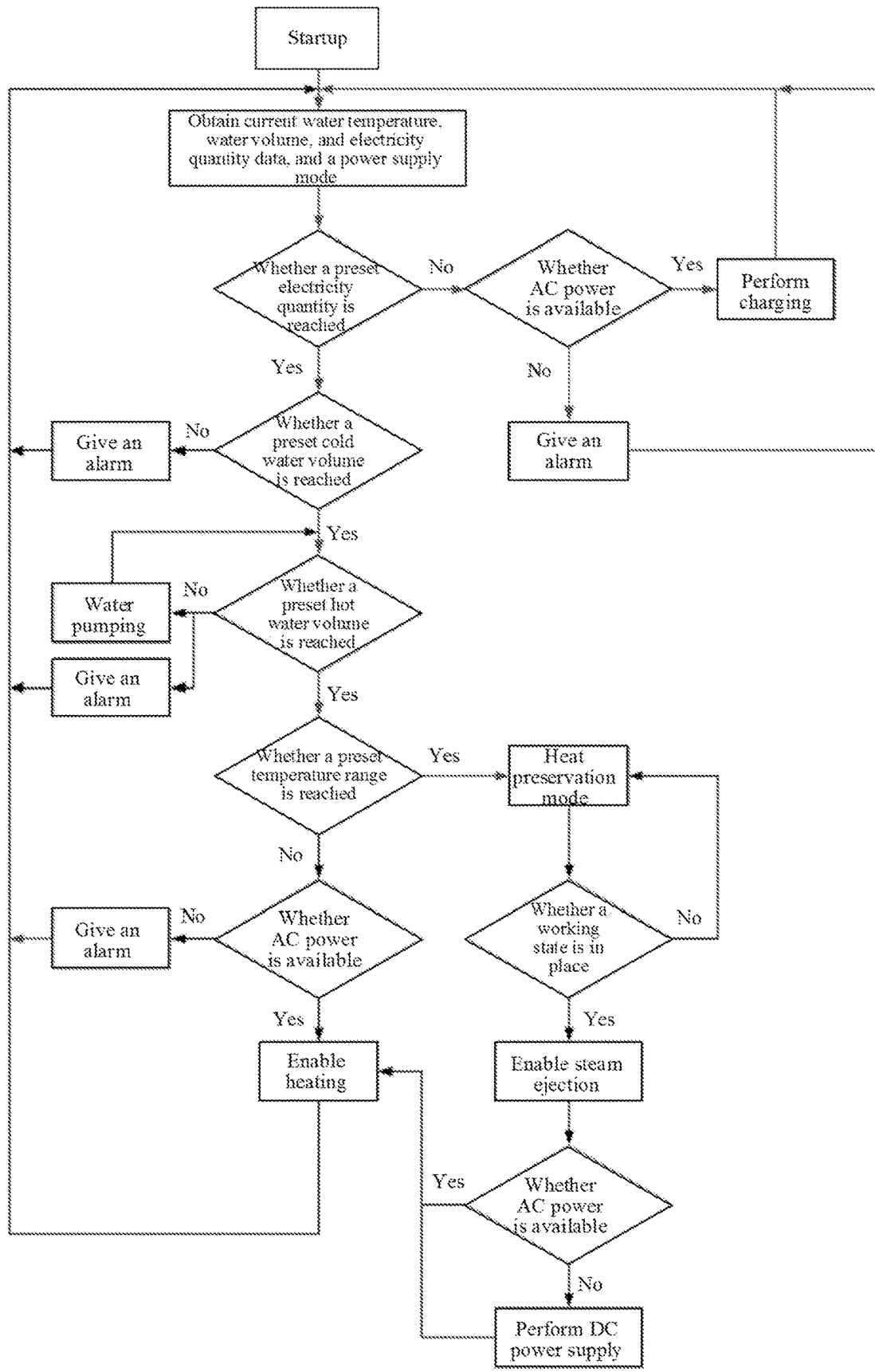
FIG. 1 is a flowchart of a steam control method according to the present disclosure.

As shown in FIG. 1, an electric steam control method includes the following operations.

After an apparatus is started up, current water temperature data and water volume data of a hot water tank, water volume data of a cold water tank, electricity quantity data of a DC power supply unit, and a current power supply mode are obtained in real time.

Electricity quantity detection: Whether an electricity quantity corresponding to the current electricity quantity data reaches a preset electricity quantity is detected. If the electricity quantity corresponding to the current electricity quantity data reaches the preset electricity quantity, cold water volume detection is performed. If the electricity quantity corresponding to the current electricity quantity data does not reach the preset electricity quantity, a detection on whether there is an available AC power is performed. If the AC power is available, power supply and charging are performed by using the AC power, until the preset electricity quantity is reached. If the AC power is unavailable, an electricity quantity alarm signal is generated. In response to the electricity quantity alarm signal, an alarm is given to indicate that the current electricity quantity is insufficient. When a user places a working main body on a charging base, the main body detects an AC input and can enter an AC power supply mode to charge the main body.

Cold water volume detection: Whether a second water volume corresponding to the current water volume data of the cold water tank reaches a preset cold water volume is determined. Hot water volume detection is performed if the second water volume reaches the preset cold water volume, or a cold water volume alarm signal and a stop signal are generated if the second water volume does not reach the preset cold water volume. In response to the cold water volume alarm signal, an alarm is given to indicate that the current cold water volume is insufficient. In response to the stop signal, the work is suspended. In this case, the main body cannot be started until the user replenishes enough cold water into the cold water tank.

Hot water volume detection: Whether a first water volume corresponding to the current water volume data of the hot water tank reaches a preset hot water volume is determined. Water temperature detection is performed if the first water volume reaches the preset hot water volume, or a water pumping signal and a hot water volume alarm signal are generated if the first water volume does not reach the preset hot water volume. In response to the water pumping signal, water is provided to the hot water tank from the cold water tank. In response to the hot water volume alarm signal, an alarm is given until the first water volume reaches the preset hot water volume.

Water temperature detection: Whether a temperature corresponding to the current water temperature data of the hot water tank is within a preset temperature range is determined. In this example, the preset temperature range is 80° C. to 90° C. A heat preservation mode is entered if the temperature is within the preset temperature range. Whether the AC power is currently available is detected if the temperature is not within the preset temperature range. Power supply is performed by using the AC power if the AC power is available, or a water temperature alarm signal is generated if the AC power is unavailable. The water temperature alarm signal can remind the user to place the main body on the charging base and heat it by using the AC power. In other words, cold water is first heated to 80° C. to 90° C. by using the AC power, and then further heated by using the AC power or the DC power as required to obtain high-temperature steam. In this way, a DC unit only supplies power during the second heating process, so its energy consumption is greatly reduced compared with the energy consumption in the first heating process, thereby prolonging a battery life.

In the heat preservation mode, whether a working state is currently in place is detected (namely, whether the user enters an operation instruction is detected, and the working state is in place when there is an operation instruction entered). If the working state is in place, whether the AC power is currently available is detected, and a steam ejection signal is generated. If the AC power is available, power supply is performed by using the AC power. If the AC power is unavailable, power supply is performed by using DC power. If the working state is not in place, the heat preservation mode is maintained.

In response to a heating signal, a heat treatment unit heats a medium in the hot water tank.

The above process is repeated in a startup state, so as to meet a requirement of normal use. It should be noted that when the main body is removed from the charging base, the main body automatically switches to DC power supply. When the main body is placed on the charging base, the main body automatically switches to AC power supply and is charged at the same time.

The alarm signals generated in cold water volume detection, hot water volume detection, and electricity quantity detection may be different signals, such that the user can know a current situation for a corresponding operation.

Figure 2:
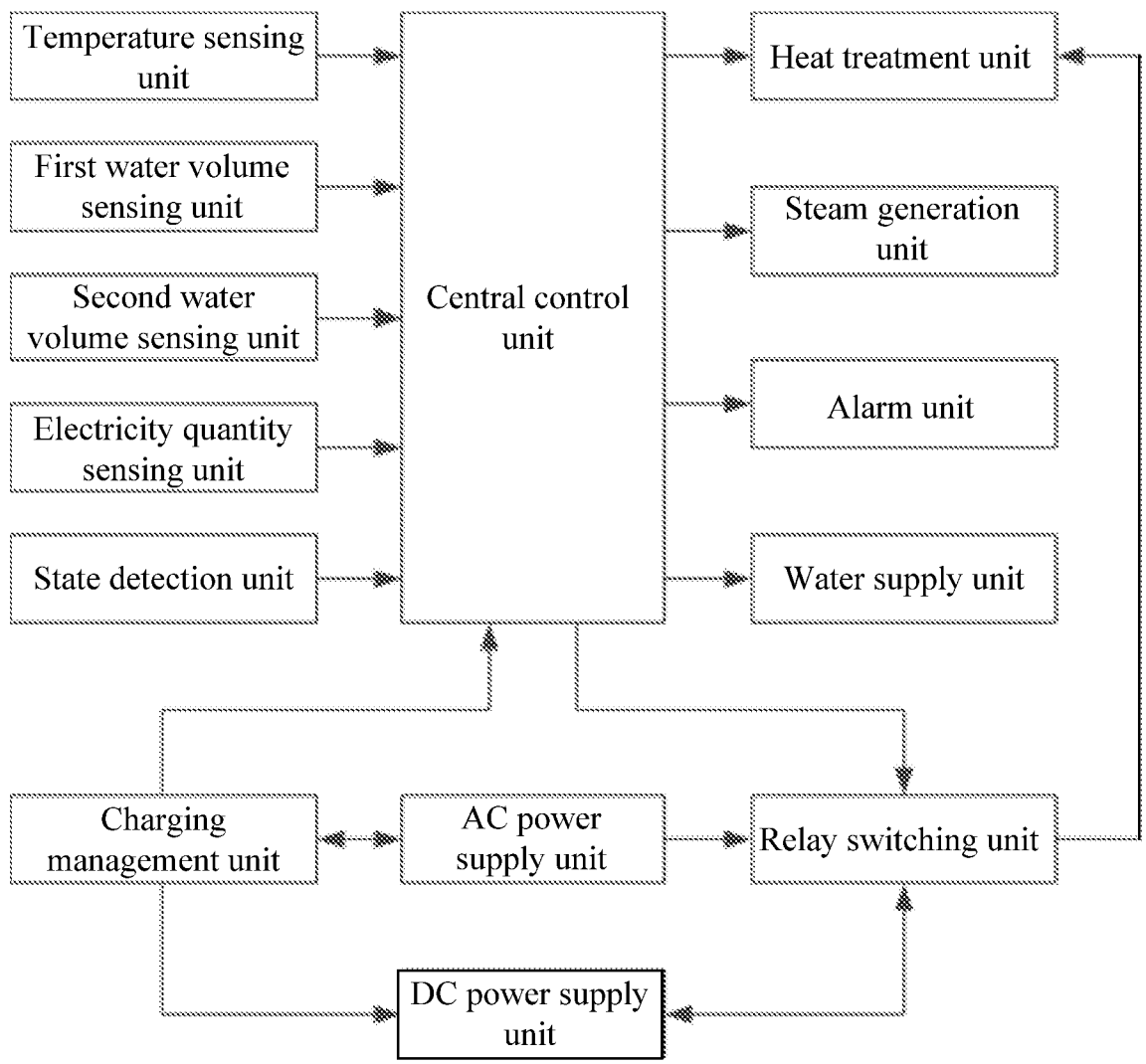
FIG. 2 is a block diagram of a steam control system according to the present disclosure.

As shown in FIG. 2, based on the same inventive concept, the present disclosure further provides an electric steam control system, including: a temperature sensing unit, a power supply sensing unit, a central control unit, a relay switching unit, a heat treatment unit, a state detection unit, a DC power supply unit, an AC power supply unit, a steam generation unit, a cold water volume sensing unit, a hot water volume sensing unit, a water supply unit, an electricity quantity detection unit, and an alarm unit.

The temperature sensing unit is configured to obtain current water temperature data of a hot water tank, and is installed in the hot water tank.

The power supply sensing unit is configured to obtain a current power supply mode.

The central control unit is configured to determine whether an electricity quantity corresponding to current electricity quantity data reaches a preset electricity quantity; and if the electricity quantity corresponding to the current electricity quantity data reaches the preset electricity quantity, determine whether a second water volume corresponding to current water volume data of a cold water bank reaches a preset cold water volume; or if the electricity quantity corresponding to the current electricity quantity data does not reach the preset electricity quantity, determine whether AC power is currently available, and perform power supply and charging by using the AC power till the preset electricity quantity is reached if the AC power is available, or generate an electricity quantity alarm signal if the AC power is unavailable;

determine whether the second water volume corresponding to the current water volume data of the cold water tank reaches the preset cold water volume, and determine whether a first water volume corresponding to current water volume data of the hot water tank reaches a preset hot water volume if the second water volume reaches the preset cold water volume, or generate a cold water volume alarm signal and a stop signal if the second water volume does not reach the preset cold water volume;

determine whether the first water volume corresponding to the current water volume data of the hot water tank reaches the preset hot water volume, and determine whether a temperature corresponding to the water temperature data is within a preset temperature range if the first water volume reaches the preset hot water volume, or generate a water pumping signal and a hot water volume alarm signal if the first water volume does not reach the preset hot water volume;

determine whether the temperature corresponding to the current water temperature data of the hot water tank is within the preset temperature range; and if the temperature is within the preset temperature range, enter a heat preservation mode; or if the temperature is not within the preset temperature range, detect whether the AC power is currently available, and perform power supply by using the AC power if the AC power is available, or perform power supply by using DC power if the AC power is unavailable; and in the heat preservation mode, detect whether a working state is currently in place; and if the working state is in place, detect whether the AC power is currently available and generate a steam ejection signal, and perform power supply by using the AC power if the AC power is available, or perform power supply by using the DC power if the AC power is unavailable; or if the working state is in place, maintain the heat preservation mode.

The relay switching unit is configured to perform power supply by using the AC power if the AC power is available, and perform power supply by using the DC power if the AC power is unavailable.

The heat treatment unit is configured to heat a medium in the hot water tank in response to a heating signal, and is further configured to cut off a working circuit in response to the stop signal.

The state detection unit is configured to obtain the current working state. The DC power supply unit is configured to power the heat treatment unit if the AC power is unavailable. The AC power supply unit is configured to power the heat treatment unit if the AC power is available.

The steam generation unit is configured to eject steam in response to the steam ejection signal, which is a fan.

The hot water volume sensing unit is configured to obtain the current water volume data of the hot water tank, which is installed in the hot water tank. The cold water volume sensing unit is configured to obtain the current water volume data of the cold water tank, which is installed in the cold water tank. The water supply unit is configured to supply water to the hot water tank from the cold water tank in response to the water pumping signal, which is a water pump.

The electricity quantity detection unit is configured to obtain current electricity quantity data of the DC power supply unit.

A charging management unit is configured to charge the DC power supply unit if the AC power is available.

The present disclosure further provides a steam cleaner, including a processor and a memory, where the memory stores a computer program, and the computer program is executed by the processor to implement the steps of the electric steam control method described above.

In the description of the present disclosure, it should be understood that orientation or position relationships indicated by terms such as "upper", "left" and "right" are orientation or position relationships as shown in the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure. In addition, the terms such as "first" and "cold water volume" are used only for descriptive purposes, and should not be construed as indicating or implying relative importance or implying the number of indicated technical features. Thus, features defined with "first" and "cold water volume" may explicitly or implicitly include one or more of the features.

In the description of the present disclosure, unless otherwise specified, "a plurality of" means at least two. In the description of the present disclosure, it should be noted that, unless otherwise clearly specified and limited, meanings of terms "install", "connected with", and "connected to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

The above described are preferred implementations of the present disclosure, and it should be noted that for those of ordinary skill in the art, various improvements and modifications may be made without departing from the principles of the present disclosure. These improvements and modifications should be regarded as falling within the protection scope of the present disclosure.

What is claimed is:

1. An electric steam control method, characterized by comprising:

obtaining current water temperature data of a hot water tank and a current power supply mode;

determining whether a temperature corresponding to the current water temperature data of the hot water tank is within a preset temperature range; and if the temperature is within the preset temperature range, entering a heat preservation mode; or if the temperature is not within the preset temperature range, detecting whether an alternating current (AC) power is currently available, and performing a power supply by using the AC power if the AC power is available, or generating a water temperature alarm signal if the AC power is unavailable;

heating, by a heater, a medium in the hot water tank in response to a heating signal, and giving a first alarm in response to the water temperature alarm signal;

in the heat preservation mode, detecting whether a working state is currently in place; and if the working state is in place, detecting whether the AC power is currently available and generating a steam ejection signal, and performing the power supply by using the AC power if the AC power is available, or performing the power supply by using a direct current (DC) power if the AC power is unavailable; or if the working state is not in place, maintaining the heat preservation mode; and ejecting steam in response to the steam ejection signal; and before determining whether the temperature corresponding to the current water temperature data of the hot water tank is within the preset temperature range, further comprising:

obtaining current water volume data of the hot water tank;

determining whether a first water volume corresponding to the current water volume data of the hot water tank reaches a preset hot water volume, and performing a water temperature detection if the first water volume reaches the preset hot water volume, or generating a water pumping signal and a hot water volume alarm signal if the first water volume does not reach the preset hot water volume;

supplying water to the hot water tank from a cold water tank in response to the water pumping signal; and giving a second alarm in response to the hot water volume alarm signal, and before determining whether the first water volume corresponding to the current water volume data of the hot water tank reaches the preset hot water volume, further comprising:

obtaining current water volume data of the cold water tank;

determining whether a second water volume corresponding to the current water volume data of the cold water tank reaches a preset cold water volume, and performing a hot water volume detection if the second water volume reaches the preset cold water volume, or generating a cold water volume alarm signal and a stop signal if the second water volume does not reach the preset cold water volume; and giving a third alarm in response to the cold water volume alarm signal, and suspending operations of the electric steam control method in response to the stop signal.

2. The electric steam control method according to claim 1, characterized in that before determining whether the second water volume corresponding to the current water volume data of the cold water tank reaches the preset cold water volume, the electric steam control method further comprises:

obtaining current electricity quantity data of a DC power supply; and detecting whether the AC power is currently available; and if the AC power is available, performing the power supply and charging by using the AC power; or if the AC power is unavailable, determining whether an electricity quantity corresponding to the current electricity quantity data of the DC power supply reaches a preset electricity quantity, and maintaining a current status if the electricity quantity reaches the preset electricity quantity, or generating an electricity quantity alarm signal if the electricity quantity does not reach the preset electricity quantity; and giving a fourth alarm in response to the electricity quantity alarm signal.

3. A steam cleaner, characterized by comprising a processor and a memory, wherein the memory stores a computer program, and the computer program is executed by the processor to implement the steps of the electric steam control method according to claim 1.

\* \* \* \* \*